United States Patent Office 2,778,748
Patented Jan. 22, 1957

2,778,748

DESTATICIZATION OF PLASTIC ARTICLES

Richard G. Rowe, Redding Ridge, and Guiles Flower, Jr., Darien, Conn., assignors to Dictaphone Corporation, Bridgeport, Conn., a corporation of New York No Drawing. Application April 11, 1952,
Serial No. 281,907

4 Claims. (Cl. 117—138.8)

This invention relates to the destaticization of articles molded from organic molding plastics and is concerned with both the destaticized products and the method of rendering the articles anti-static. The destaticized products of the present invention are especially useful as media to be employed in recording sound and will be illustratively described in connection with such use, although as the description proceeds it will become apparent that they may be used for other purposes as well, such as, for example, in sheet form as wrappings for various articles and for a variety of other uses where anti-static properties are useful.

Plastic sound recording media have been extensively used for some years in at least two major fields, namely, in the manufacture of phonograph records and as recording media in dictating machines wherein they may be used in the form of discs, sheets, endless belts or in other forms. One problem encountered in connection with the use of plastics as recording media arises out of the tendency of the surface of the plastic to acquire a static charge as the recording or reproducing stylus passes thereover. This static charge causes dust to be attracted to and accumulate in the grooves cut by the stylus. The dust works its way into the grooves of the records from which it is very difficult to remove. An accumulation of dust and grit remaining in the grooves increases the noise level and tends to produce an abrasive action on the record grooves thereby causing undue wear of the grooves and distortion of the sound reproduction.

It is a general object of the present invention to provide a plastic article having improved anti-static properties. It is another object of the invention to provide a sound recording medium having recording grooves that do not attract dust. Other objects of the invention will be in part obvious and in part pointed out hereafter.

We have found that the tendency of molded plastic articles to accumulate a surface charge of static electricity can be materially reduced and in many cases completely eliminated by forming on the plastic surface a thin layer of 2-heptadecyl 2-imidazoline 1-ethanol. The imidazoline is a known compound which can be conveniently made from aminoethylethanolamine and stearic acid by methods that have been previously disclosed. Its structural formula is as follows:

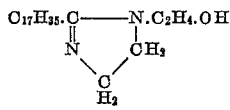

The imidazoline can be applied to the plastic surface in any of various ways, but we have found it especially convenient to prepare a solvent solution of the imidazoline and then either dip the plastic article in the solution or alternatively wet a sponge or cloth with the solution and rub the plastic surface therewith. Subsequent evaporation of the solvent deposits a very thin layer of the imidazoline on the plastic. While the dipping or rubbing steps can be repeated to form a thicker layer if desired, our experience has been that a single application of the solution is usually sufficient.

The imidazoline can be dissolved in either an aqueous or a non-aqueous solvent. Films deposited from non-aqueous solvents, e. g. petroleum solvents, are more water-resistant than those deposited from aqueous solvents such as aqueous alcohols, but are less satisfactory in other respects. We have found that for general use aqueous isopropanol containing about 40% by weight of isopropanol is an exceptionally useful solvent.

The concentration of imidazoline used can be varied considerably depending upon the solvent used and the nature of the plastic to which it is to be applied. Concentrations as high as 12% to 15% by weight give satisfactory results in particular cases. However, when 40% aqueous isopropanol is used as a solvent the optimum imidazoline concentration appears to be about 1% by weight for most applications. If a lower concentration is used, the destaticization is incomplete. On the other hand if higher concentrations are used there is a tendency for the deposited film to be greasy or cloudy, which is particularly objectionable in the case of transparent plastics. Also, in order to dissolve the higher concentrations of imidazoline more isopropanol must be used and in the case of certain plastics the stronger solvent tends to attack the plastic surface. Hence for general use the most satisfactory solution is one containing, by weight, about 40% isopropanol, 1% heptadecyl imidazoline ethanol and 59% water.

In order to point out more fully the nature of the present invention the following specific examples are given of illustrative methods of carrying out the invention.

*Example 1*

A solution of 2-heptadecyl 2-imidazoline 1-ethanol was prepared by refluxing 39.7% by weight isopropanol, 1% of the imidazoline and 59.3% water until the imidazoline had completely dissolved. A sponge saturated with this solution was rubbed over one side of a vinyl LP phonograph record of standard commercial formulation and the solvent permitted to evaporate. The record was then tested for anti-static activity in the following manner:

A thin layer of cigarette ashes was spread on a piece of paper and a 6" ruler arranged in a vertical position close thereto. The record was rubbed briskly half a dozen times with a soft, dry cotton cloth and then gradually lowered along the rule to determine the height at which it first attracted ashes from the layer of ashes on the paper. During the test the paper was continuously shaken to maintain the ashes in a fluid state. It was found that a record treated as described above could be lowered into direct contact with the ashes without attracting them. On the other hand, an untreated record when rubbed with a dry cloth as described acquired a static charge such that it attracted ashes at a height of 3 inches under the same test conditions.

*Example 2*

A piece of ethyl cellulose foil was treated with the 1% imidazoline solution of Example 1 and the solvent evaporated. It was found that the imidazoline film deposited was slightly cloudy but that this cloudiness could be removed by a light buffing action.

The treated ethyl cellulose foil and a piece of untreated foil were subjected to the cigarette ash test of Example 1, and it was found that the untreated foil attracted ashes at a height of 2½ inches whereas the treated foil was completely anti-static.

*Example 3*

A piece of extruded cellulose acetate butyrate foil was treated with 1% imidazoline solution as in Example 1 and tested in comparison with an untreated piece of the same foil. The untreated foil attracted cigarette ashes at a height of 3" whereas the treated foil was completely anti-static.

*Example 4*

A mixture was prepared containing 12.4% by weight heptadecyl imidazoline ethanol, 43.8% benzene and 43.8% Solvasol No. 5 (a petroleum hydrocarbon mixture having a boiling range of 305° to 382° F.). This mixture was stirred in a high speed agitator for 5–10 minutes, at the end of which time the mixture was a yellowish suspension. A soft cloth was soaked in this suspension and then rubbed over the surface of a piece of methyl methacrylate to deposit a thin coating of the suspension thereon. The solvent was evaporated as in the previous examples.

The thus treated methacrylate was compared with untreated methacrylate by the cigarette ash test of Example 1, and it was found that the untreated plastic attracted ashes at a height of 3 inches whereas the treated methacrylate was completely anti-static. A second test of the treated methacrylate made six months after the first test showed that the anti-static properties of the treated plastic were not diminished by aging.

*Example 5*

Pieces of polystyrene resin were coated in the same manner as the methacrylate of Example 4. The untreated polystyrene attracted cigarette ashes at a height of 2 inches, whereas the treated polystyrene was completely anti-static both initially and after 30 days aging.

*Example 6*

Samples of polyethylene were treated according to the procedure of Example 1 and tested. Untreated polyethylene attracted ashes at a height of 3½ inches whereas the treated polyethylene was completely anti-static under the same test conditions.

*Example 7*

A piece of foil made of a terephthalic anhydrideglycol derivative sold under the trade name "Mylar" was treated according to the procedure of Example 1, tested, and found to be completely anti-static by the cigarette ash test.

From the foregoing examples it is apparent that the present invention provides an unusually simple and effective method of rendering molded plastic articles anti-static. It has been found that in the case of thin foils it is not essential to apply the imidazoline to the surface that is to be made anti-static, since if one side only of the foil is treated both sides are rendered anti-static. Thus, in one case an extruded cellulose acetate butyrate belt adapted to be used for sound recording purposes was treated according to the procedure of Example 3. The belt material was a foil about 0.006 inch thick and the belt was 12 inches in circumference and 3½ inches wide. The interior surface only of the belt was treated with the imidazoline solution and it was found that the exterior surface of the belt had been rendered anti-static. It is evident that this feature of applicant's method renders it especially advantageous for application to sound recording media, since the medium can be effectively destaticized without modifying the sound recording surface thereof.

It is of course to be understood that the foregoing description is illustrative only and that numerous changes can be made without departing from the spirit of the invention as defined in the appended claims.

We claim:

1. An anti-static plastic article consisting of a sound recording medium molded from an organic molding plastic selected from the group consisting of synthetic resins and cellulosic plastics, and having a thin layer of heptadecyl imidazoline ethanol thereon.

2. An anti-static plastic article adapted to be used for sound recording purposes, said article being an endless belt molded from an organic molding plastic selected from the group consisting of synthetic resins and cellulosic plastics, and having a thin layer of heptadecyl imidazoline ethanol thereon.

3. An anti-static plastic article adapted to be used for sound recording purposes, said article being an endless belt molded from an organic molding plastic selected from the group consisting of synthetic resins and cellulosic plastics, and having a thin layer of heptadecyl imidazoline ethanol on the inside surface only thereof.

4. The method of rendering anti-static an endless belt made of an organic molding plastic selected from the group consisting of synthetic resins and cellulosic plastics, adapted to be used for sound recording purposes which comprises rubbing an approximately 1% by weight solution of heptadecyl imidazoline ethanol in aqueous isopropanol on the inside surface only of said belt, and causing the aqueous isopropanol to evaporate to deposit a layer of the imidazoline on the belt surface.

References Cited in the file of this patent

UNITED STATES PATENTS

| | | |
|---|---|---|
| 2,030,568 | Bren | Feb. 11, 1936 |
| 2,215,861 | Waldmann et al. | Sept. 24, 1940 |
| 2,249,514 | Berg et al. | July 15, 1941 |
| 2,312,913 | Kirby et al. | Mar. 2, 1943 |
| 2,403,960 | Stoops et al. | July 16, 1946 |
| 2,581,836 | Cresswell | Jan. 8, 1952 |
| 2,597,708 | Cresswell | May 20, 1952 |